United States Patent Office 3,238,207
Patented Mar. 1, 1966

3,238,207
6-OXYORGANOPURINES AND METHOD OF PREPARING THEM
George H. Hitchings, Yonkers, Gertrude B. Elion, Bronxville, and Irving Goodman, White Plains, N.Y., assignors to Burroughs Wellcome & Co. (U.S.A.) Inc., Tuckahoe, N.Y., a corporation of New York
No Drawing. Filed Mar. 1, 1960, Ser. No. 11,967
2 Claims. (Cl. 260—252)

This is a continuation-in-part of application Serial No. 539,271, filed October 7, 1955, now abandoned.

This invention relates to substituted 6-mercaptopurines and to processes for preparing them.

6-mercaptopurine and thioguanine described in U.S. Patents 2,697,709 and 2,884,667 are known to be useful inhibitors of cell division, particularly with regard to providing temporary remissions of acute leukemia.

The main object of the present invention is to provide a novel group of compounds which more effectively inhibit unnatural cell division and multiplication in general and with particular respect, for example, to chronic myelocytic leukemia. Pharmacologically, the compounds have been shown effective in transplanted animal tumors. The present derivatives appear to modify and extend the effective range of the known mercaptopurines through the absence of toxic side effects, whereby a greater therapeutic index is obtained. The compounds are also bacteriostatic and inhibit lactic acid bacteria.

The compounds visualized by the present invention are those having the formula:

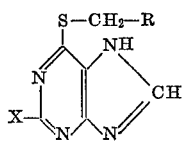

wherein X is selected from the class consisting of hydrogen and an amino group, and R is selected from the class consisting of organic radicals containing one to three carbon atoms and one to two oxygen atoms. Characteristic of the oxygen-containing organic radicals, which can be represented by R, are the hydroxyalkyl, oxo-alkyl and carboxyalkyl radicals.

The invention likewise contemplates the novel process for the manufacture of the compounds of the indicated formula in substantial yields. The most useful method for the preparation of these new derivatives is by the reaction of a selected mercaptopurine with a halide of the desired substituent radical in the presence of a suitable acceptor of the acid so formed.

The following examples illustrate the preparation of typical substituted mercaptopurine compounds in accordance with the present invention.

*Example 1.—6-acetonylmercaptopurine*

10 gm. of 6-mercaptopurine monohydrate (I) was suspended in 100 cc. water. To the suspension was added a solution of 4 gm. KOH in 100 cc. water. When (I) had completely dissolved, an equivalent (5.5 gm.) of α-chloroacetone was added and the mixture was stirred for 3 hours at room temperature. The precipitate was filtered and washed with water. Yield, 9 gm. (70% of theory). The melting point was 184-186°.

*Example 2.—2-amino-6-acetonylmercaptopurine*

The directions of Example 1 were followed, substituting 2-amino-6-mercaptopurine for 6-mercaptopurine hydrate. This experiment gave 8.5 g. of the desired product, melting at 198-199°.

*Example 3.—6-(β-hydroxyethyl)-mercaptopurine*

6-mercaptopurine (5 g.) was reacted with 2-chloroethanol (2.5 ml.) in a solution containing 2 g. of potassium hydroxide and the product was isolated as described in Example 1. It melted at 185° with partial sublimation.

*Example 4.—6-carboxymethylmercaptopurine*

A solution of 5 g. of 6-mercaptopurine hydrate and 3 g. of chloroacetic acid in 60 ml. of N sodium hydroxide was heated to boiling and filtered. The filtrate was acidified by adding 14 ml. of 2 N hydrochloric acid and the product crystallized. It was recrystallized from hot water; it melted with decomposition at about 230°.

*Example 5.—2-amino-6-carboxymethylmercaptopurine*

This product was prepared substantially as described above for 6-carboxy-methylmercaptopurine. It (6 g.) was purified by solution in 400 ml. of dilute sodium hydroxide solution, and by adding this solution slowly into 1 l. of boiling water containing a slight excess of hydrochloric acid. The product decomposed without melting at about 300°.

What we claim is:
1. 6-acetonylmercaptopurine.
2. 2-amino-6-acetonylmercaptopurine.

References Cited by the Examiner

FOREIGN PATENTS 560,171    7/1958    Canada.

NICHOLAS S. RIZZO, *Primary Examiner.*

DUVAL T. McCUTCHEN, H. J. LIDOFF, IRVING MARCUS, *Examiners.*